INVENTOR.
ROBERT A. HAVEMANN,
BY Allen & Allen
ATTORNEYS.

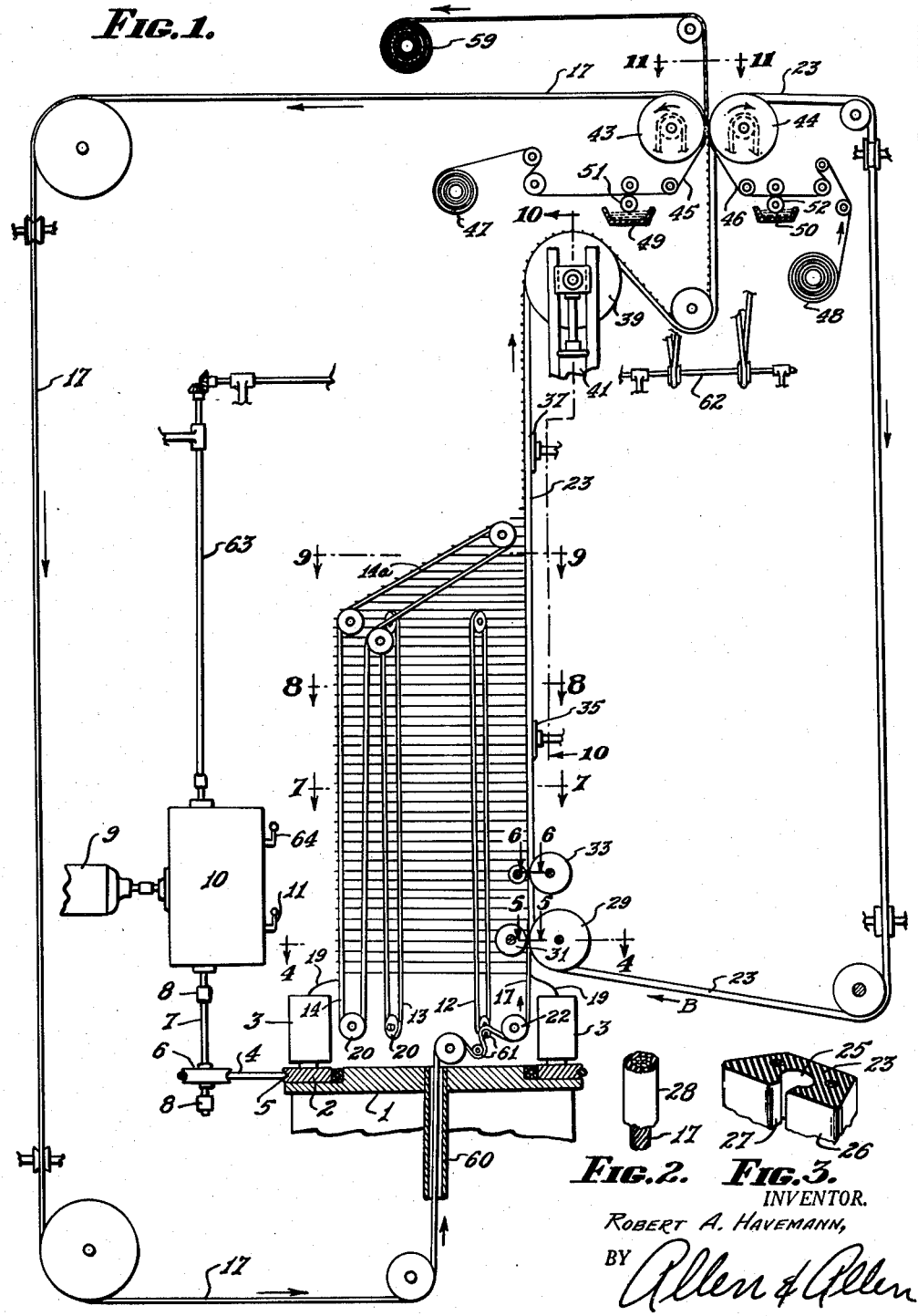

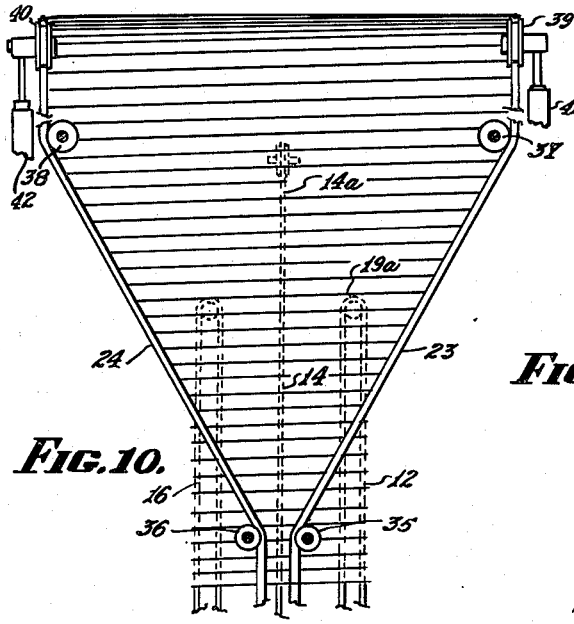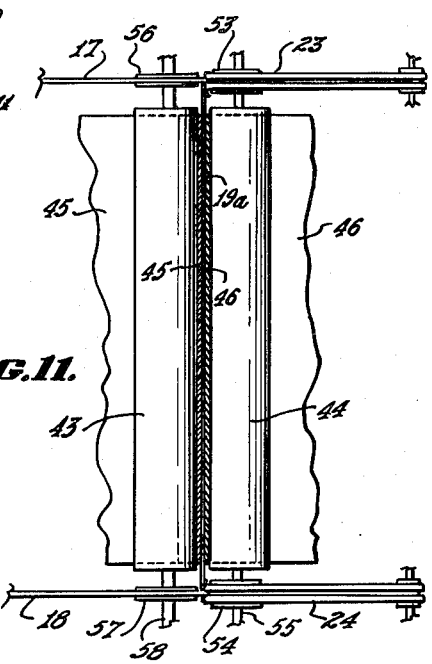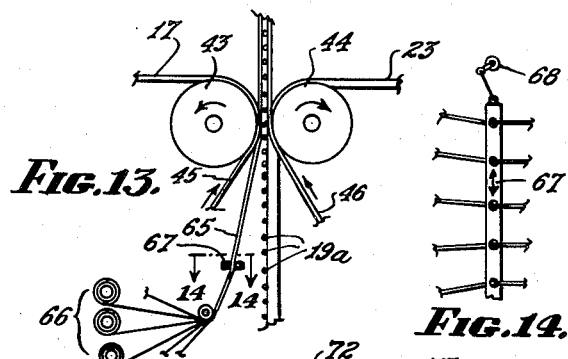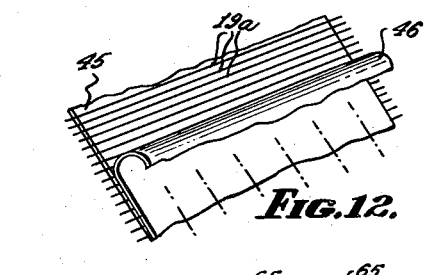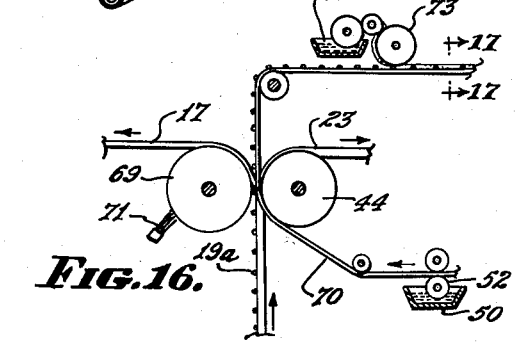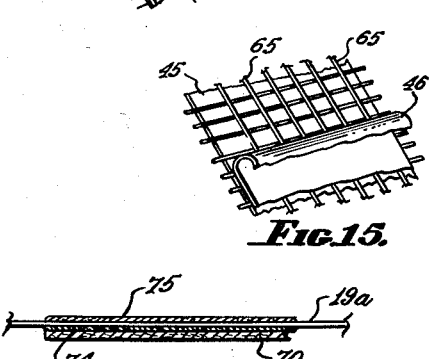
INVENTOR.
ROBERT A. HAVEMANN,
BY Allen & Allen
ATTORNEYS ical elevational view of apparatus in accordance with my invention.

United States Patent Office 2,954,816
Patented Oct. 4, 1960

2,954,816

APPARATUS AND METHOD FOR REINFORCING SHEET MATERIAL

Robert A. Havemann, Troy, Ohio, assignor to St. Regis Paper Company, a corporation of New York Filed Jan. 31, 1956, Ser. No. 562,376

26 Claims. (Cl. 154—1.76)

This invention relates to the manufacture of reinforced sheet material and more particularly to sheet material having reinforcing strands extending transversely to the length of the sheet material, although my invention also contemplates the conjoint application of longitudinally extending reinforcing strands thereto.

Reinforced sheet material of the character herein contemplated is widely used in the manufacture of gummed tape, the reinforcing strands being sandwiched between webs of kraft paper or suitable tape forming webs the juxtaposed surfaces of which are coated with a laminating adhesive in which the reinforcing strands are embedded. A coating of adhesive or tape gumming is applied to a surface of the laminated web and dried, whereupon the coated web is wound into a roll. The roll may then be severed transversely of its length into a plurality of tape rolls of the desired width. The reinforcing strands greatly enhance the strength characteristics of the tape and, in particular, the transversely disposed strands serve to span the edges of two surfaces being joined, as for example in the formation of a manufacturer's joint in a corrugated shipping carton, the reinforcing strands serving to resist the shearing forces tending to tear the tape lengthwise along the joint. In the manufacture of such tape two opposing factors have seriously hampered the commercial development of transversely reinforced tape: (1) the desirability of having the strand reinforcement extend truly crosswise of the tape, i.e. at substantially right angles to the longitudinal axis of the tape, as opposed to extending slantwise thereof, and (2) the ability to apply the strand reinforcement to the sheet at commercially acceptable speeds. While various devices and procedures have been proposed which satisfy one or the other of these requirements, none of them to my knowledge satisfy both of them. Generally speaking, those which satisfy the speed requirement involve spinning a continuous length of the strand reinforcement into helical convolutions about moving webs of sheet material. The helical path of the convolutions results in the reinforcement being deposited on the web slantwise to its direction of movement rather than at right angles thereto. Efforts to compensate for this condition, as by wrapping the sheet material about a mandrel and applying the reinforcement to the convoluted sheets, have resulted in materially reducing the speed at which the material can be satisfactorily handled.

In addition to the manufacture of reinforced tape as above discussed, it will be understood that the invention is applicable also to the manufacture of reinforced sheet material and so-called "scrim" or non-woven fabric for numerous other purposes.

In the light of the foregoing, it is a principal object of the instant invention to provide an apparatus and procedure by means of which reinforcing strands may if desired be deposited on the sheet material at precisely right angles to the longitudinal axis thereof and at commercially practicable speeds.

A further object of the invention is the provision of a method and means for applying transverse reinforcement which does not of necessity require that the reinforcement be sandwiched between opposed webs of sheet material, but rather includes the application of the reinforcement to a single web of sheet material for use in the manufacture of tape wherein the reinforcement lies in the glue line of the tape.

Another object of the invention is the provision of apparatus which is capable of applying transversely disposed strands alone or in combination with longitudinally disposed strands to provide an open mesh reinforcement in the nature of scrim.

Still a further object of the invention is the provision of apparatus for forming reinforced sheet material which may be readily adjusted, even during its operation, to vary the spacing between adjacent strands.

Yet a further object of my invention is the provision of unique mechanism for forming the reinforcing strands into parallel rows and thereafter aligning the rows of strands for subsequent application to the web or webs of sheet material, the said strands being positively maintained in aligned position at the time of their application to the web material, thereby assuring accurate and uniform disposition of the strands throughout the finished product.

The foregoing as well as other objects of the invention which will appear hereinafter or which will be apparent to the skilled worker in the art upon reading these specifications, are accomplished by those constructions and arrangements of parts and by those procedures of which I shall now describe certain exemplary embodiments.

Reference is now made to the accompanying drawings wherein:

Figure 1 is a diagrammatical elevational view of apparatus in accordance with my invention.

Figure 2 is an enlarged fragmentary perspective view of a strand contacting cable.

Figure 3 is an enlarged fragmentary perspective illustrating a strand engaging belt for use in conjunction with the cable of Figure 2.

Figure 10 is a vertical sectional view taken along the line 10—10 of Figure 1.

Figure 11 is a sectional view taken along the line 11—11 of Figure 1.

Figure 12 is a fragmentary perspective view with parts separated of a transversely reinforced material formed in accordance with my invention.

Figure 13 is a fragmentary diagrammatic view illustrating the manner in which longitudinally extending reinforcing strands may be applied to the web material.

Figure 14 is a diagrammatic sectional view taken along the line 14—14 of Figure 13.

Figure 15 is a fragmentary perspective view with parts separated of a reinforced material incorporating longitudinally extending reinforcement strands.

Figure 16 is a diagrammatic view similar to Figure 13 illustrating a modification of my invention.

Figure 17 is a vertical sectional view taken along the line 17—17 of Figure 16.

Figure 4:
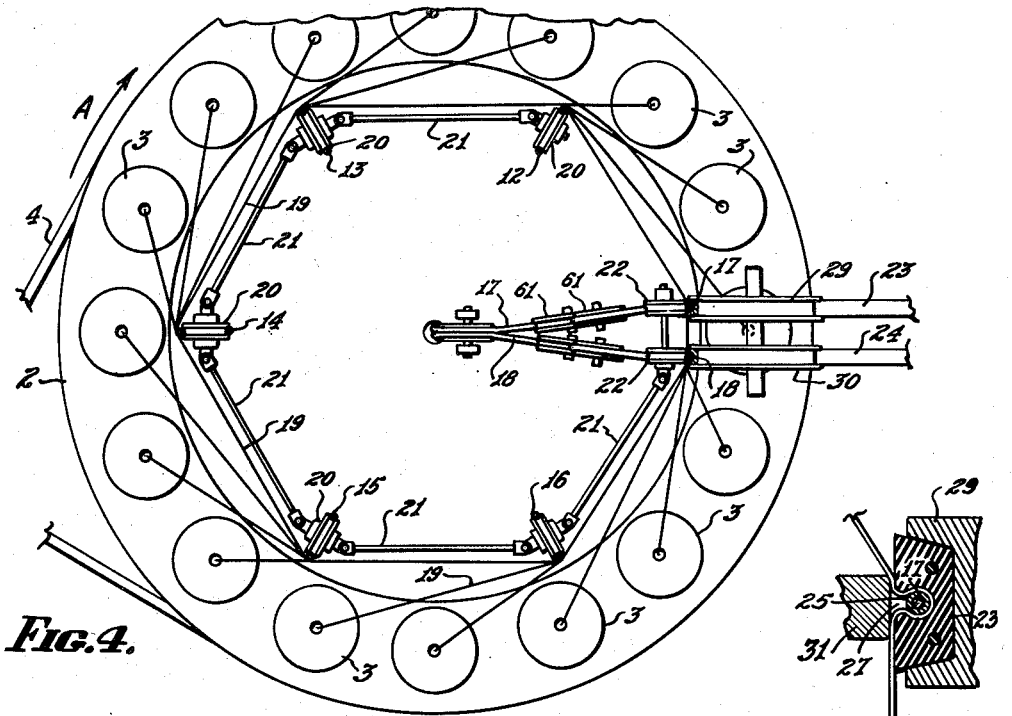
Figure 4 is a sectional view taken along the line 4—4 of Figure 1.

As diagrammatically illustrated in Figure 1 of the drawings, the apparatus comprises a stationary platform or table 1 on which is rotatably mounted a circular rotatable turret 2 carrying a plurality of spindle assemblies 3. In the embodiment illustrated the circular turret is adapted to be driven by means of a V-belt 4 engaging in a peripheral groove 5 in the turret, the belt passing around a pulley 6 mounted on a driven shaft 7 journaled in brackets 8. The shaft 7 is driven by a prime mover 9 acting through speed change gear mechanism indicated generally at 10, a suitable control lever 11 being provided to vary the speed of the turret.

Mounted above the platform 1 and to the inside of the spindle assemblies 3 are a plurality of vertically extending endless belts 12, 13, 14, 15 and 16, the latter two belts being best seen in Figure 4 of the drawings. The vertical extending belts, together with a pair of cables 17 and 18, define a generally hexagonal prism about which the reinforcing strands 19 fed from the spindle assemblies 3 are wrapped as the turret 2 is rotated in the direction of the arrow A. At their lower ends the belts pass around driven sheaves 20 connected together by driving rods 21 which are driven from the cable contacting sheaves 22, the movement of the cables serving to rotate the sheaves 22 and through them the sheaves 20 and the belts 12—16. By means of this arrangement the belts are driven in unison with their outer flights, about which the reinforcing strands are wrapped, traveling upwardly. Thus, as the reinforcing strands are wound about the belts by the rotation of the turret 2, they will be formed into continuous helical convolutions traveling upwardly with the belts in spaced apart relation, the spacing of the convolutions being dependent upon the speed of rotation of the turret and the lineal speed of the belts. It will be understood that the surfaces of the belts are such that the reinforcing strands will make frictional contact therewith sufficient to prevent the slippage of the strands.

Strand receiving belts 23 and 24 are arranged to coincide with the upward paths of travel of the cables 17 and 18, each of the strand receiving belts being provided with a cable receiving channel 25, as best seen in Figure 3, the channel opening outwardly toward the face of the belt in a narrow resilient neck 27. As best seen in Figure 2, the cables, such as the cable 17, are preferably encased in a plastic jacket or casing 28 which provides a smooth exterior surface and also protects the strands from possible damage by reason of their contact with the filaments making up the braided cable.

Figure 5:
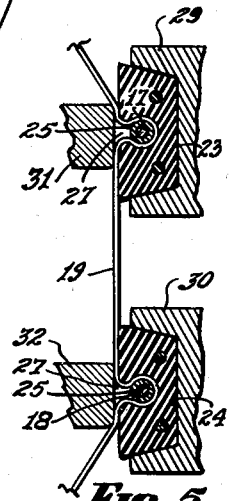
Figure 5 is a sectional view taken along the line 5—5 of Figure 1.

As the strand receiving belts are moved along in the direction of the arrow B (Figure 1) they pass around sheaves 29 and 30, and at the same time the cables 17 and 18 are contacted by the rollers 31 and 32 which act to press the cables into the channels 25 where they are maintained by reason of the narrower resilient neck portions 27. This action will be best understood by reference to Figure 5 which also serves to clearly illustrate that the insertion of the cables into the channels serves to lock each convolution of the reinforcing strands between the cables and the strand receiving belts. It will be understood, of course, that the belts 23 and 24 are driven in unison with the cables 17 and 18.

Figures 7, 9:
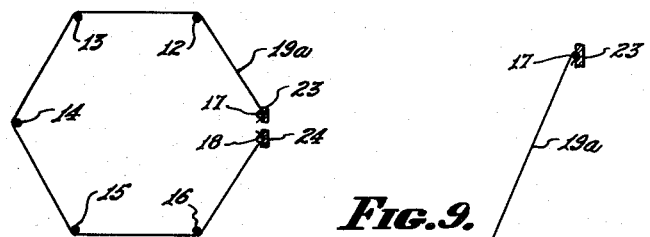
Figure 7 is a diagrammatic sectional view taken along the line 7—7 of Figure 1.
Figure 9 is a diagrammatic sectional view taken along the line 9—9 of Figure 1.
Figure 8:
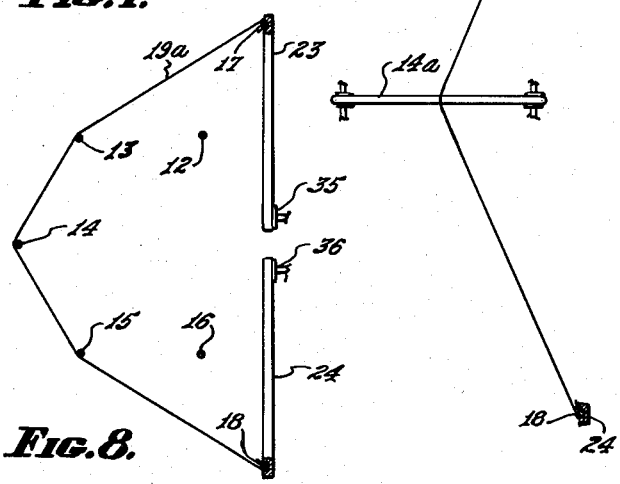
Figure 8 is a diagrammatic sectional view taken along the line 8—8 of Figure 1.
Figure 6:
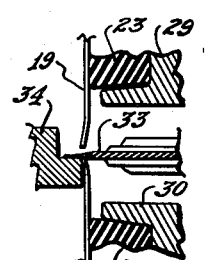
Figure 6 is a sectional view taken along the line 6—6 of Figure 1.

With each convolution of the reinforcing strands thus securely fastened to the belts 23 and 24, the strands are next severed in the areas between the belts 23 and 24 which, at this point in the operation, are spaced apart by a distance of approximately several inches. Thus, as seen in Figure 6, each strand 19 is severed or crush cut by a rotary knife 33 coacting with a rotary bed member 34. Immediately following the action of the cutting knife, each convolution of the strand will be formed into a strand length 19a and will be in the condition diagrammatically illustrated in Figure 7. Thereafter, the strand receiving belts 23 and 24 are moved apart along diverging paths of travel, the belts passing around pairs of idler rollers 35, 36 and 37, 38, as best seen in Figure 10. As the belts diverge the severed ends of each strand length 19a will be moved outwardly and, as the upward movement of the convolutions continues, the strand lengths will be first withdrawn from contact with the opposed belts 12 and 16 and then with the opposed belts 13 and 15, as will be apparent from Figure 8 of the drawings. It is preferable, however, to continue the belt 14 beyond the upper ends of the remaining belts, the upper portion of the belt 14 being inclined upwardly and inwardly, as at 14a, so that it will serve as a convenient means for guiding the strands 19a as they are drawn to a substantially linear position, which position will be reached as the belts pass around the idler rollers 37, 38. Upon being fully separated the belts are passed around a pair of independently adjustable sheaves 39 and 40 which are adjustable vertically by adjustment means indicated generally at 41 and 42.

In the normal operation of the apparatus one of the sheaves 39, 40 will be displaced vertically relative to the other of the sheaves so as to effectively increase the path of travel of one of the belts 23, 24 to compensate for the initially slant-wise condition of the strands 19a occasioned by their initial formation about the belts 12—16 in helical convolutions. The displacement of one of the adjustable rollers relative to the other roller will shorten the path of travel of one of the belts and thereby effectively advance the position of the end of the strand secured to the last named belt, thus bringing the strands, as they pass beyond the rollers 39 and 40, into precise horizontal alignment.

Referring again to Figure 1, the horizontally aligned strands are next passed between a pair of combining rolls 43, 44 which act to laminate the strands between opposed webs of sheet material 45 and 46. The webs of sheet material may be conveniently fed to the combining rolls from supply rolls 47 and 48, the webs as they are withdrawn from the supplies being coated on their contacting surfaces with laminating adhesive supplied from the glue pots 49, 50 and applied by coating rollers 51, 52, as will be readily understood.

As best seen in Figure 11, the width of the sheet material is somewhat less than the length of the strands 19a, and the arrangement of parts is such that the strand receiving belts lie beyond the ends of the combining rolls, the belts passing around sheaves 53 and 54 journaled on the shaft 55 supporting the combining roll 44. As the lengths of strand reinforcement pass between the nip of the combining rolls they are bonded between the webs of sheet forming material and supported thereby; and it is no longer necessary to support the strands by means of the belts 23 and 24. Consequently, the cables 17 and 18 are removed from the channels in the belts by passing the cables around sheaves 56, 57 journaled on the shaft 58 of combining roll 43, the belts moving in one direction and the cables in the opposite direction. The free ends of the strands extending beyond the side edges of the laminated sheet material are thus released and the reinforced sheet material may be conveniently wound on a storage roll 59. The separated belts and cables then pass around suitable idler rollers and are returned to their points of beginning. In this connection, it will be noted that the cables may conveniently pass upwardly through a centrally disposed sleeve 60 in the table 1 and then around tensioning rollers 61 which will serve to maintain the cables in taut condition for driving engagement with the sheaves 22.

The cables and the strand receiving belts are themselves driven from the combining rolls 43 and 44 which in turn are driven from a driving shaft 62 operatively connected through shaft 63 to the speed change gear mechanism 10, the speed of the combining rolls, the strand engaging belts and cables, and the belts 12—16, are controlled by a control lever 64 forming a part of the speed change gear mechanism. It will be apparent that all of these elements will move in synchronism.

Figure 12 illustrates the reinforced sheet material formed on the apparatus just described. The free ends of the reinforcing strands, of course, will be cut off as an incident of the subsequent severing of the rolled sheet material into the desired tape widths. It should be apparent from the foregoing that the reinforcing strands may be applied between the paper webs at precisely right angles to the direction of motion of the webs and the mechanism employed readily lends itself to high speed commercial operation.

Figure 13 of the drawings diagrammatically illustrates the manner in which the apparatus may be adapted to incorporate longitudinally extending strand reinforcement in the laminated sheet material. Thus, as the webs of sheet material 45 and 46 and the strand reinforcement 19a are led between the combining rolls, longitudinally extending strands 65 may be fed upwardly into the nip of the rolls. The strands 65 may be conveniently fed from a creel, indicated at 66, the strands being fed in spaced relation to the web through a perforated guide bar arranged to oscillate transversely of the web, as is well understood in the art, the guide bar being oscillated by suitable means indicated at 68. The resultant product is illustrated in Figure 15 wherein it will be noted that the longitudinal and transverse strands form a reinforcement in the nature of a non-woven fabric or scrim.

Figure 16 illustrates the manner in which the invention may be adapted to apply the transverse reinforcing strands to a single sheet of web material to form a tape in which the reinforcement lies in the glue line. In this instance the combining roll 43 is replaced by a roll 69 made up of a series of closely spaced disc-like members capable of pressing the exposed strands 19a into contact with the adhesively coated surface of the web 70 passing around the roll 44. The disc-like configuration of the roll 69 prevents any appreciable accumulation of adhesive on the roll, and if desired the roll may be cleaned by a cleaning device 71 arranged to remove accumulated adhesive from the edges of the discs. Subsequent to the application of the strands to the web, an adhesive reservoir 72 and coating wheel 73 may be employed to apply the glue line gumming to the reinforced surface of the web. The resultant product is illustrated in Figure 17, the strand securing adhesive applied by the coating roller 52 being indicated at 74 and the glue line gumming at 75.

Further modifications may be made in the invention without departing from the spirit or purpose of it. For example, while the table or platform 1 is shown as a stationary element supporting a rotatable turret 2, the table itself may be made rotatable, in which event the belts 12—16 and their sheaves will be supported by means other than the table. Similarly, the drive mechanism for the various parts is exemplary only and numerous modifications and variations will readily occur to the skilled worker in the art. It also can be pointed out that the convoluted strand reinforcement 19 may be engaged and secured to the belts 23 and 24 by means other than the cables. For example, instead of the cable receiving channel 25 and narrow neck 27, the belts could be provided with something in the nature of a slit having sufficient resiliency to inherently grip and retain the strands, the strands being inserted into the slits by means of rotating discs which would replace the rollers 31 and 32. Obviously the nature of the sheet forming material, the strand reinforcement and the adhesives employed do not constitute limitations on the invention and their nature will depend on the qualities desired in the products being formed.

Having thus described the invention in certain exemplary embodiments, what is desired to be protected and secured by Letters Patent is:

1. An apparatus for depositing reinforcing strands substantially transversely of a moving web comprising means for forming and advancing continuous helical convolutions of strand reinforcement, means for engaging and gripping each convolution of the strand reinforcement at closely spaced apart points, means for severing the convolutions between said closely spaced apart points to form strand lengths, means for moving apart the ends of the strand lengths to form linear strands, and means for bonding the linear strands to a web of sheet material with the strands extending perpendicular to the length of the sheet material.

2. An apparatus for depositing reinforcing strands substantially transversely of a moving web comprising means for forming a continuous length of reinforcement into continuous helical convolutions, means for supporting the helical convolutions and moving them in a path of travel, means for severing the convolutions to form strand lengths, means for drawing the strand lengths into linear condition and advancing them in spaced apart parallel relationship, and means for applying and bonding the strand lengths to a web of sheet material.

3. An apparatus for depositing reinforcing strands substantially transversely of a moving web comprising means for forming a continuous length of reinforcement into continuous helical convolutions, means for supporting the helical convolutions and moving them in a path of travel, gripping means for engaging and holding the convolutions at closely spaced apart points, means for severing each convolution intermediate said closely spaced apart points, means for causing said gripping means to diverge so as to withdraw the severed convolutions from said supporting means and at the same time draw them taut, means for bringing the taut strand lengths into perpendicular alignment with respect to their path of travel, and means for bonding said strand lengths to a web of sheet material with the strand lengths extending perpendicular to the direction of motion of the web.

4. In apparatus for depositing reinforcing strands on a moving web, means for forming and advancing continuous helical convolutions of strand reinforcement, means for engaging and gripping each convolution of the strand reinforcement at closely spaced apart points, means for severing the convolutions between said closely spaced apart points to form strand lengths, means for causing said gripping and engaging means to diverge so as to draw the strand lengths into linear condition and for conveying the strands between a pair of combining rolls for contact with a web of sheet material, and means for feeding additional strand reinforcements between said combining rolls in perpendicular relationship to said strand lengths.

5. In apparatus for depositing reinforcing strands substantially transversely of a moving web, means for spinning continuous lengths of strand reinforcement into helical convolutions, means for supporting and moving said helical convolutions in a path of travel, means for severing the helical convolutions into unit lengths, means for gripping the helical convolutions adjacent the point at which they are severed and for drawing the severed convolutions into linear strands extending transversely of the path of travel of said strands and for feeding the said linear strands between a pair of combining rolls where they are bonded to a web of sheet material.

6. A method of making a transversely reinforced web which comprises forming a continuous length of strand reinforcement into helical convolutions, gripping each convolution at closely spaced apart points, severing each convolution between the said spaced apart points to divide the continuous length of strand reinforcement into unit lengths, drawing each of the unit lengths so formed into a linear strand, and feeding the linear strands into contact with the surface of a web of sheet material and bonding the strands to the surface of said web.

7. A method of making a transversely reinforced web which comprises forming a continuous length of strand reinforcement into helical convolutions, moving said convolutions in a path of travel and while the convolutions are so moving, gripping each convolution at closely spaced apart points, severing the convolutions between the said spaced apart points to divide the continuous length of strand reinforcement into unit lengths, moving apart the severed ends of each unit length so as to draw it into a linear strand, and feeding the linear strands into contact with the surface of a web of sheet material and bonding said strands to the surface of said web.

8. A method of making a transversely reinforced web which comprises spinning continuous lengths of strand reinforcement into continuous helical convolutions, gripping each convolution at closely spaced apart points, severing the convolutions between the said spaced apart points to divide the continuous lengths of strand reinforcement into severed lengths, drawing the severed lengths into linear strands while maintaining gripping engagement with the ends of the severed strands, bringing the strands into transverse alignment with respect to their path of travel, and feeding the aligned strands into contact with the surface of a web of sheet material moving in a path of travel paralleling the path of travel of the aligned strands at their point of contact, bonding the strands to said web, and thereafter releasing the ends of the strands.

9. A method of making a reinforced sheet which comprises forming a continuous length of strand reinforcement into helical convolutions, gripping the convolutions at closely spaced apart points, severing each convolution between the said spaced apart points to divide the continuous length of strand reinforcement into unit lengths, drawing the unit lengths into linear strands, feeding the linear strands between a pair of webs of sheet material, and at the same time feeding additional strands between the webs of sheet material at substantially right angles to said linear strands, including the step of bonding all of said strands to said webs.

10. A method of making a transversely reinforced sheet which comprises forming continuous lengths of strand reinforcement into helical convolutions, moving the said helical convolutions in a path of travel and as said convolutions are being moved, gripping each convolution at closely spaced apart points, severing the convolutions between the said spaced apart points to divide the continuous lengths of strand reinforcements into strand lengths, moving apart the severed ends of the strand lengths so as to draw them into linear alignment, and feeding the aligned strands between a pair of webs of sheet material and bonding the strands to said webs.

11. In apparatus for depositing reinforcing strands substantially transversely of a moving web, means for forming continuous lengths of reinforcement into continuous helical convolutions, means for supporting the helical convolutions and moving them in a path of travel, means traveling with said supporting and moving means for engaging and gripping each convolution at closely spaced points, means for severing the convolutions intermediate said closely spaced apart points, means for withdrawing the severed convolutions from said supporting and moving means and for drawing them taut, a pair of combining rolls between which at least one web of sheet material is fed, and means for bringing said taut strands into contact with a surface of said web as the web is passed between said combining rolls.

12. In apparatus for depositing reinforcing strands substantially transversely of a moving web, means for forming continuous lengths of reinforcement into continuous helical convolutions, means for supporting and moving the helical convolutions in a path of travel, means for severing each convolution to provide strand lengths, and conveying means for engaging and gripping each convolution on each side of the point at which it is severed, for drawing apart the severed ends of the convolutions to form them into linear strands, and for conveying the strands between a pair of combining rolls where they are contacted and bonded to the surface of a web of sheet material.

13. The apparatus claimed in claim 12 wherein the means for forming continuous lengths of strand reinforcement into continuous helical convolutions comprises a rotatable turret mounting a plurality of spindle assemblies containing the strand reinforcement.

14. The structure claimed in claim 13 wherein the means for supporting and moving the helical convolutions in a path of travel comprises a plurality of endless belts extending at substantially right angles to the plane of said rotatable turret.

15. The apparatus claimed in claim 14 wherein said conveying means comprises a pair of strand receiving belts and a coacting pair of cables, wherein said helical convolutions are formed about said cables, said cables moving in parallel relationship to said endless belts, wherein said strand receiving belts have longitudinal channels formed therein, and wherein the path of travel of said belts coincides with the path of travel of said cables in the area of said helical convolutions, there being means for inserting said cables in the channels in said belts, whereby to grip the convolutions of said strand reinforcements therebetween.

16. In apparatus for depositing reinforcing strands substantially transversely of a moving web, a pair of combining rolls between which a web of sheet material is adapted to be passed, shafts mounting said combining rolls for rotary movement, pulley wheels mounted on said shafts beyond the ends of said rolls, strand receiving belts passing around the pulley wheels at each end of the combining rolls, and cables passing around the pulley wheels at each end of the other of said combining rolls, means forming a moving support for continuous strands of helical convolutions wound about said support, said strand receiving belts constituting a part of said moving support and having longitudinally extending channels therein, means for inserting said cables in the channels in said belts as the convolutions of strand reinforcement are formed about said support, whereby said convolutions of strand reinforcement are held in engagement with said belts by means of said cables, means for severing the helical convolutions of strand reinforcement in the area between said belts, whereby, as said belts approach said combining rolls, the severed lengths of strand reinforcement will be led between the nip of said rolls, the said belts and cables being separated from each other as they pass around their respective pulley wheels, thereby releasing the reinforcing strands as they pass through the said rolls and are juxtaposed to said moving web.

17. The apparatus claimed in claim 16 wherein, at the time the cables are inserted in the channels in said belts, the belts are in closely spaced apart relation.

18. The apparatus claimed in claim 17 wherein, as said belts and cables pass beyond said moving support, the said belts are caused to diverge so as to draw the severed reinforcement into linear strands, whereupon the belts and cables, with the strand reinforcement therebetween, are returned to said combining rolls.

19. In apparatus for forming and conveying unit lengths of strandlike material and for applying the same transversely to other and longitudinally moving material, means for forming a continuous length of such strandlike material into continuous generally helical convolutions, means for releasably gripping the helical convolutions and moving them in a path of travel, means for severing the convolutions to form them into strand lengths with their end portions gripped by said gripping means, said gripping means then acting to advance said strand lengths in spaced apart relationship and into contact with said longitudinally moving material and with the strand lengths extending transversely with respect to their direction of advance, and means for releasing said gripping means subsequent to contact of said strand lengths with said longitudinally moving material.

20. Apparatus according to claim 19 wherein the means for releasably gripping the said convolutions comprise endless flexible belts and means cooperating therewith to grip the strandlike material, said flexible belts having continuous longitudinal channels in which the strandlike material is received and said cooperating gripping means comprising flexible cables adapted to be received in the longitudinal channels of said belts.

21. Apparatus according to claim 20 including guide means for said cables to guide said cables at predetermined points into the channels to grip therein the strandlike material, and additional guide means to later direct the cables from the channels to release the strand-like material after contact therewith by the longitudinally moving material.

22. A method of forming and conveying unit lengths of strandlike material and applying the same transversely to other and longitudinally moving material, which comprises the steps of forming a continuous length of such strand material into helical convolutions, moving said convolutions in a path of travel and while said convolutions are so moving, releasably gripping each convolution at spaced apart points, severing the convolutions between said spaced apart points to divide the continuous length of strand reinforcement into strand lengths, advancing said strand lengths into contact with said longitudinally moving material while maintaining the gripping engagement thereon adjacent the severed ends of each unit length, and thereafter releasing the said gripping engagement of the said strand-like material.

23. In apparatus for forming and conveying unit lengths of strandlike material, means for forming continuous lengths of such strandlike material into continuous generally helical convolutions, means for releasably gripping the helical convolutions at spaced apart points and moving them in a path of travel, means for severing the convolutions to form them into unit lengths with their opposite end portions engaged by said gripping means, said gripping means then acting to advance said unit lengths in substantially linear condition, and means for thereafter releasing said gripping means, whereby to release said unit lengths for deposit in linear condition.

24. The apparatus claimed in claim 23 wherein the means for releasably gripping the said convolutions comprises flexible belts having continuous longitudinal channels therein in which the strandlike material is received.

25. The apparatus claimed in claim 24 wherein said gripping means includes continuous flexible cables adapted to be received in the longitudinal channels of said belts to secure said strandlike material thereto.

26. A method of forming and conveying unit lengths of strandlike material, which comprises the steps of forming continuous lengths of such strandlike material into helical convolutions, moving the convolutions so formed in a path of travel and, while said convolutions are so moving, releasably gripping each convolution at spaced apart points, severing the convolutions between said spaced apart points to divide the continuous lengths of strand reinforcement into unit lengths, advancing the unit lengths in substantially linear condition with the unit lengths extending transversely with respect to their direction of travel, and thereafter releasing said unit lengths for deposit in linear condition.

References Cited in the file of this patent

UNITED STATES PATENTS

| | | |
|---|---|---|
| 1,195,951 | Harrison | Aug. 22, 1916 |
| 2,439,043 | Evans | Apr. 6, 1948 |
| 2,496,911 | Green | Feb. 7, 1950 |
| 2,561,781 | Bruce | July 24, 1951 |
| 2,718,254 | Carlson | Sept. 20, 1955 |
| 2,778,404 | Macy et al. | Jan. 22, 1957 |

FOREIGN PATENTS

| | | |
|---|---|---|
| 440,191 | Great Britain | Dec. 16, 1935 |
| 713,543 | Great Britain | Aug. 11, 1954 |